United States Patent [19]

Sakamoto et al.

[11] Patent Number: 4,703,246
[45] Date of Patent: Oct. 27, 1987

[54] CONTROL METHOD AND APPARATUS FOR SYNCHRONOUS MOTOR

[75] Inventors: Keiji Sakamoto, Hachioji; Toshio Kobayashi, Hino, both of Japan

[73] Assignee: Fanuc Ltd., Yamanashi, Japan

[21] Appl. No.: 842,706

[22] PCT Filed: Jul. 10, 1985

[86] PCT No.: PCT/JP85/00388

§ 371 Date: Mar. 3, 1986

§ 102(e) Date: Mar. 3, 1986

[87] PCT Pub. No.: WO86/00766

PCT Pub. Date: Jan. 30, 1986

[30] Foreign Application Priority Data

Jul. 10, 1984 [JP] Japan ............................. 59-141362

[51] Int. Cl.⁴ .............................................. H02P 5/40
[52] U.S. Cl. .................................... 318/809; 318/298; 318/805
[58] Field of Search ................ 318/805, 798, 807–811; 363/41

[56] References Cited

U.S. PATENT DOCUMENTS

| | | | |
|---|---|---|---|
| 3,662,247 | 5/1972 | Schieman | 363/41 |
| 3,851,234 | 11/1974 | Hoffman | 318/800 |
| 3,971,972 | 7/1976 | Stich | 363/41 |
| 4,310,791 | 1/1982 | Akamatsu | 318/809 |
| 4,330,741 | 5/1982 | Nagase et al. | 318/809 |
| 4,445,080 | 4/1984 | Curtiss | 318/798 |
| 4,456,868 | 6/1984 | Yamamura et al. | 318/800 |
| 4,458,192 | 7/1984 | Sakamoto et al. | 318/811 |
| 4,482,855 | 11/1984 | Otsuka et al. | 318/809 |

OTHER PUBLICATIONS

Kaufman et al, "High-Performance Servo Drives for Machine-Tool Applications Using AC Motors", IAS, 1982, pp. 604–609.

Primary Examiner—David Smith, Jr.

[57] ABSTRACT

When a synchronous motor (6) using a permanent magnetic field is controlled by the control of an inverter (4) receiving a pulse width modulation signal, wherein the reactive component of an armature winding current is defined as $I_b$, the inductance of the armature winding as L, the counter electromotive force constant of the synchronous motor as $K_1$, and the constant introduced from the pole number of the synchronous motor as $K_2$, the value of the reactive component $I_b$ of the armature winding current is limited so that the multiplied product of $K_2$, L, and $I_b$ does not exceed the value of $K_1$. By the limitation, a saturation degree of the differential signal between a current command signal defined by the peak value of a reference carrier wave and the armature winding current is detected, the phase of the current command signal is changed from the phase perpendicular to the armature winding current to a rotary magnetic field main flux in response to the saturation degree, and the inverter control prevents the decrease of the output power by the pulse width modulation of the synchronous motor.

3 Claims, 11 Drawing Figures

CONTROL METHOD AND APPARATUS FOR SYNCHRONOUS MOTOR

TECHNICAL FIELD

The present invention relates to a control method and a control apparatus for a synchronous motor. More particularly, the present invention is applied where the synchronous motor is controlled by using a pulse width modulation (PWM) signal which is made from a position signal of a revolving-field, a command input, and a reference carrier wave, when a synchronous motor using permanent magnets as a rotor is controlled.

BACKGROUND ART

FIG. 1 shows a block circuit diagram for PWM control of a conventional synchronous motor using permanent magnets. FIG. 2 shows an outline of functions of the transistor PWM control circuit in the apparatus of FIG. 1. In FIG. 1, reference numeral 1 denotes a three-phase power source, 2 a rectification circuit, 4 a transistor inverter, 5 a transistor PWM control circuit, 6 a synchronous motor using permanent magnets as a rotor, and 7 a rotor rotation detector, for example, a pulse encoder, for detecting a position and speed of the rotor of the synchronous motor 6. The transistor PWM control circuit 5 compares a velocity command value $V_0$ with a present velocity V (speed) detected by the rotor rotation detector 7, switches ON or OFF respective transistors 411 to 416 in the transistor inverter 4, and controls the speed by controlling the electric current through windings having U, V, and W phases in the synchronous motor 6.

As shown in FIG. 2, the transistor PWM control circuit mainly comprises a velocity command value to a present velocity value comparator, an armature current detector, a multiplier for generation of an armature current command value, a phase shifter, a differential amplitude filter for generation of an armature current command value, a feedback portion for saturation detection, and an inverter circuit control signal generator.

The operation of the synchronous motor in the apparatus of FIG. 1 is explained by using the vector diagrams shown in FIG. 3 and FIG. 4A through FIG. 4D. In FIG. 3, the radius V of the circle shows the peak value of the supply voltage to the synchronous motor, and the reference symbol $I_a$ shows an effective current component in the armature winding, $K_1$ shows a countervoltage constant, $K_2$ shows a constant corresponding to the pole number, $\omega$ shows an angular velocity of the rotation of the motor, and L shows an inductance of the armature winding for each phase, respectively. If the total magnetic flux is $\Phi$, the number of turns of the stator winding is N, the number of poles is P, and a predetermined constant is $K_3$, and the equation $K_1 = \Phi \cdot N \cdot P \cdot K_3$ (V·sec/rad) is satisfied. Also, $K_2 = \frac{1}{2} \cdot P$. Since, when the sum of the $K_1\omega$, i.e., velocity voltage, and the $K_2 \cdot \omega L \cdot I_a$, i.e., the voltage perpendicular to the $K_1 \cdot \omega$, which is caused by the electric current $I_a$ and the inductance L, exceeds the circle V, the motor cannot be driven, thus, a reactive current component $I_b$ is added and the voltage $K_2 \cdot \omega \cdot L \cdot I_b$ is added. As a result, by leading the driving voltage into circle V, the output power of the motor can be increased. The application of the voltage $K_2 \cdot \omega \cdot L \cdot I_b$ as above-mentioned is carried out by the above-mentioned saturation detection circuit 57, ROM 514, 515, D/A converter 521, 522, phase shift circuit 541, 542, 543.

In the above-mentioned conventional apparatus, however, a problem arises wherein when the sum of each voltage vector reaches a point on a semicircle at a side opposite to the center line (shown by a dot-dash line perpendicular to the vector $K_1 \cdot \omega$) as shown in FIG. 4B, FIG. 4C, and FIG. 4D, the voltage component caused by the effective current is decreased, and the output power of the synchronous motor is reduced.

The conventional synchronous motor control method using a pulse width modulation signal was described, for example, in U.S. patent application Ser. No. 811,840 filed Dec. 12, 1985. (corresponding to International Patent Application PCT/JP85/00207) by the applicants of the present application.

SUMMARY OF THE INVENTION

An object of the present invention is to provide a control method and apparatus for a synchronous motor, which is improved so that there is no reduction in the output power thereof, based on an idea whereby the reactive current component $I_b$ of the armature windings is limited so that the $K_2 L I_b$ does not exceed the countervoltage constant $K_1$.

In the fundamental aspect of the present invention, there is provided a control method for a synchronous motor, which is a control method for controlling a synchronous motor using a permanent magnet field by the generation of a pulse width modulation signal comparing the difference between the command value of the armature winding current of the synchronous motor and the armature winding current value with the reference carrier wave, and by controlling the inverter by the pulse width modulation signal, wherein, when it is determined that the reactive component of the armature winding current is $I_b$, the inductance of the armature winding is L, the counter electromotive force constant of the synchronous motor is $K_1$, and the constant introduced from the pole number of the synchronous motor is $K_2$, the value of the reactive component $I_b$ of the armature winding current is limited, the saturation degree of the differential signal between the current command signal defined by the peak value of the reference carrier wave and the armature winding current is detected, and the phase of the current command signal is changed from the phase position perpendicular to that of the armature winding current and the field main flux in response to the saturation degree, so that the multiplied product of $K_2$, L and $I_b$ does not exceed the value of $K_1$.

In another aspect of the present invention, there is provided a control apparatus for a synchronous motor provided with current detectors at the armature windings, the field of which is linked directly to a rotation detector, an inverter circuit for supplying electric power to the armature winding of the synchronous motor, and a pulse width modulation control circuit receiving a velocity command signal, the rotation detector output signal, and the armature winding current signal and generating a signal for controlling the inverter circuit; wherein the pulse width modulation control circuit comprising a comparator which compares the velocity command signal with the signal from the rotation detector and generates an error signal, D/A converters for multiplication which generate a corrected each phase current command signal receiving a saturation degree signal representing the saturation degree of the differential value between the armature winding current command signal and the armature winding current signal, limiters for generating a limited current command signal which is limited by the predetermined condition receiving the corrected each phase current command signal from the D/A converter for multiplication, amplifier and filters for generating the armature winding current command signal based on the limited current command signal and the armature winding current signal, and pulse width modulators for generating the inverter circuit control signal receiving the signal from the amplifier and filter and the reference carrier wave signal; and by the limitation under the predetermined condition in the limiter, the reactive component $I_b$ of the armature winding current is limited so that the multiplied product of $K_2$, $L$, and $I_b$ does not exceed the value of $K_1$, when the reactive component of the armature winding current is $I_b$, the inductance of the armature winding is $L$, the constant defined by the pole number of the motor is $K_2$, and the electromotive force constant of the motor is $K_1$.

BRIEF EXPLANATION OF THE DRAWINGS

FIG. 5 is a diagram showing the connecting relationship between FIG. 5A and FIG. 5B;

BEST MODE FOR CARRYING OUT THE INVENTION

Figure 4A:
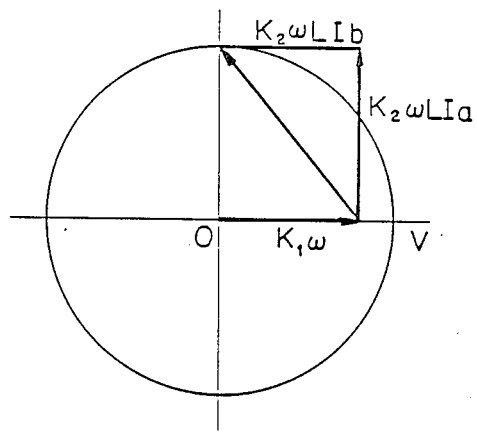
Figure 5A:
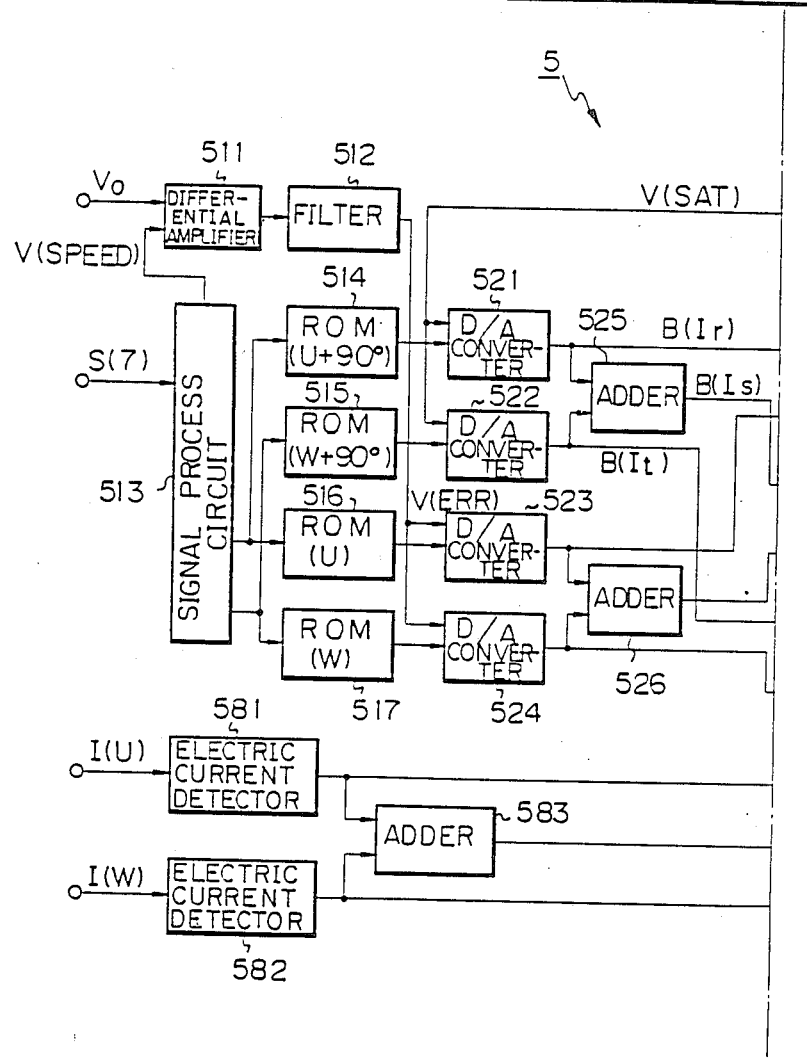
FIGS. 5A and 5B are diagrams showing the constitution of the PWM control circuit in the control apparatus for the synchronous motor according to an embodiment of the present invention.
Figure 5B:
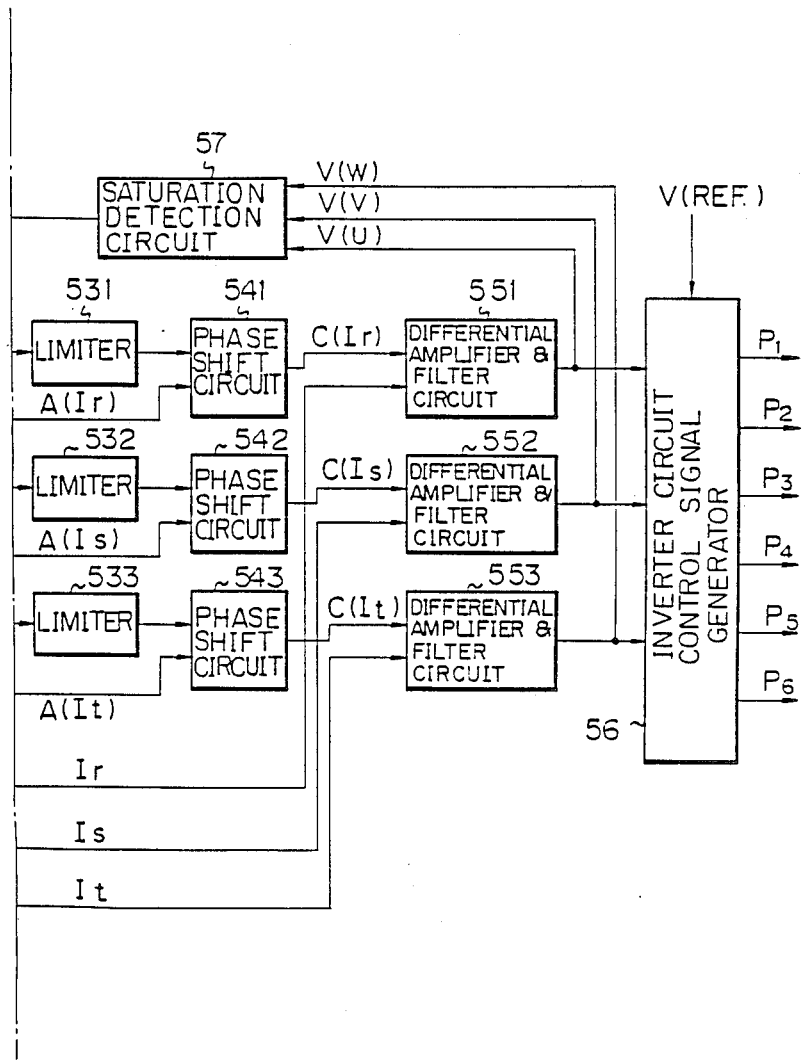
Figure 6:
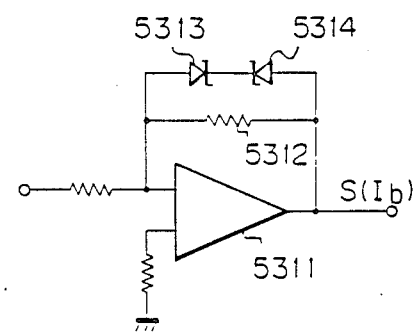
FIG. 6 is diagram showing an example of the constitution of a limiter in the apparatus of FIGS. 5A and 5B; and, FIG. 7 is a diagram showing an example of the constitution of a differential amplifier and a filter circuit in the apparatus of FIGS. 5A and 5B.
Figure 7:
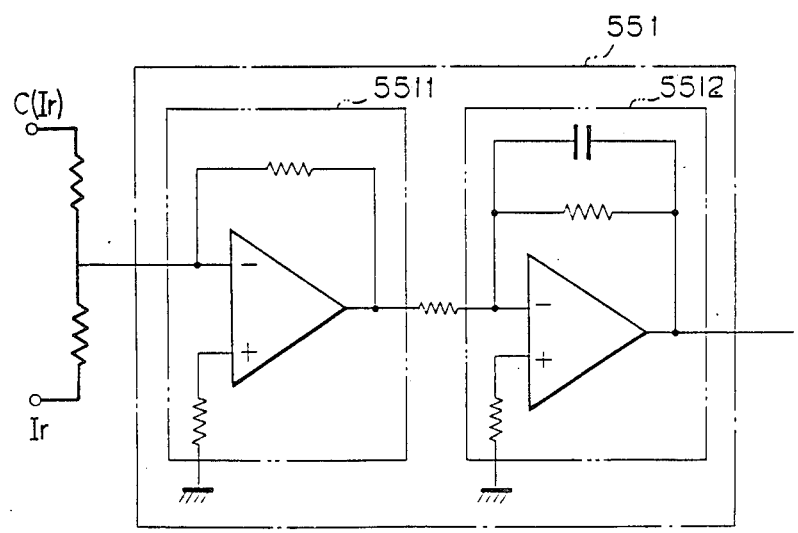

The constitution of a PWM control circuit in a control apparatus for a synchronous motor according to an embodiment of the present invention is shown in FIGS. 5A and 5B. An example of the constitution of a limiter in the apparatus of FIGS. 5A and 5B is shown in FIG. 6. An example of the constitution of a differential amplifier and filter circuit in the apparatus of FIGS. 5A and 5B is shown in FIG. 7. In the apparatus of FIGS. 5A and 5B, the relationship among the voltage/current of the synchronous motor in the apparatus of FIGS. 5A and 5B is shown in a vector diagram of FIG. 4A.

In the apparatus of FIGS. 5A and 5B, 513 is a signal process circuit, 516 and 517 are read only memories (ROM) which memorize the values in U phase and W phase to be output in the phase perpendicular to the field main magnetic flux, 514 and 515 are ROM's which memorize the values (U+90°) and (W+90°) proceeding by 90 degrees in phase to the ROM's 516 and 517, respectively, 57 is a saturation detection circuit, and 511 is a differential amplifier wherein the difference between a voltage $V_0$ showing a velocity command and a voltage V (SPEED) showing a present velocity from the signal process circuit 513 is amplified and output. 512 is a filter, the frequency response of which is low gain in the high frequency and high gain in the low frequency, in which the peak voltage is clamped by a Zener diode.

523 and 524 are multiplying digital-to-analog (D/A) converters in which the voltage generated by the difference between the velocity command $V_0$ supplied from the filter 512 and the present velocity V (SPEED) is multiplied by the command values of the U phase and W phase output from the ROM's 516 and 517, and phase current commands $A(I_r)$ and $A(I_t)$ of the U phase and the W phase, respectively, are made. 521 and 522 are multiplying D/A converters which output corrected phase current commands $B(I_r)$ and $B(I_t)$ of the U phase and the W phase by the multiplied products of the output of the saturation detection circuit and outputs of ROM's 514 and 515, respectively. 526 is an adder in which the phase current command $A(I_r)$ is added to $A(I_t)$ and the current command $A(I_s)$ having a phase difference of 120 degrees from the U phase and the W phase, is produced. 525 is an adder in which a correct phase current command $B(I_s)$ of the V phase is produced from the outputs of the multiplying D/A converters 521 and 522.

581 and 582 are detectors detecting currents I(U) and I(W) which pass through the U phase and W phase armature windings of the synchronous motor 6. 583 is an adder in which the V phase current $I_s$ is calculated from the summation of the U phase current $I_r$ and the W phase current $I_t$ detected by the U phase current detector 581 and the W phase current detector 582, respectively. 541, 542, and 543 are phase shift circuits in which the correct phase current command $B(I_r)$, $B(I_s)$ and $B(I_t)$ of the respective U phase, V phase, and W phase, are added to the respective phase current command $A(I_r)$, $A(I_s)$ and $A(I_t)$ and each phase is advanced. 551, 552, and 553 are circuits for supplying the current command voltages to be applied to the U phase, V phase, and W phase, and have the same constitution but receiving different input signals. Namely, 551 comprises a differential amplifier 5511 in which the difference between the output of the U phase phase shift circuit 541 and the present U phase detection current $I_r$ is amplified, and a low pass filter circuit 5512 for passing only the frequency component in a reference carrier wave of the output of differential amplifier 5511.

552 and 553 receive the outputs of the V phase phase shift circuit 542 and the W phase phase shift circuit 543, respectively, and receive the present current values $I_s$ and $I_t$, respectively; each is the same as the circuit 551. 56 is a circuit comprising a PWM signal process circuit and a transistor base drive amplifier, in which the signals from the above-mentioned circuits 551, 552, and 553 are compared with the reference carrier wave V (REF), and PWM signals $P_1$ to $P_6$, which turn ON or OFF each transistor 411 to 416 in a transistor inverter 4, are supplied.

A saturation detection circuit 57 receives the outputs of the circuits 551, 552, and 553. When the peak voltage of the outputs approaches the saturation voltage determined by the peak voltage of the reference carrier wave V (REF), a saturation signal V (SAT) is output corresponding to the saturation degree, and the output is supplied to the D/A converters 521 and 522.

The operation of the circuit of FIGS. 5A and 5B is explained as follows. The signal process circuit 513 supplies the address of the ROM's 516, 517, 514, and 515 corresponding to the present velocity signal V (SPEED) and the present rotor position POS (U) and POS (W). On the other hand, the differential amplifier 511 receives the velocity command $V_0$ and supplies the voltage difference between the voltage of the present velocity signal V (SPEED) and the voltage of the velocity command $V_0$, through the filter 512, as an error signal V (ERR). After receiving the error signal V (ERR) and the signals from the ROM's 516 and 517, the D/A converters 523 and 524 for multiplication in the fourth quadrant and the adder 526 supply the U phase current command $A(I_r)$, the W phase current command $A(I_t)$, and the V phase current command $A(I_s)$, respectively.

The ROM's 514 and 515 supply the U phase command value and W phase command value which exceed the output command from the ROM's 516 and 517 by 90 degrees in phase. The command values and the saturation signal V (SAT) from the above-mentioned saturation detection circuit 57 are multiplied by the multiplying D/A converters 521 and 522. The multiplied signals are supplied as the U phase correct phase current command $B(I_r)$ and the W phase correct phase current command $B(I_t)$. In the adder 525, the summation of the U phase correct phase current command $B(I_r)$ and the W phase correct phase current command $B(I_t)$ is calculated and supplied as the V phase correct phase current command $B(I_s)$. The phase current commands $A(I_r)$, $A(I_s)$, and $A(I_t)$ and each of the correct phase current commands $B(I_r)$, $B(I_s)$ and $B(I_t)$ are supplied to the phase shift circuits 541, 542, and 543, respectively. The phase shift circuits 541, 542, and 543 have the same constitution and each phase shift circuit comprises an adder and an inversion amplifier. In the phase shift circuit 541, the U phase phase current command $A(I_r)$ is added to the U phase correct phase current command $B(I_r)$ by the adder. Then, the added command is inverted by the inversion amplifier and the corrected U phase phase current command $C(I_r)$ in response to the saturation degree is obtained.

Also, the V phase corrected phase current command $C(I_s)$ and the W phase corrected phase current command $C(I_t)$ are made by the same process as the U phase. The phase current commands $C(I_r)$, $C(I_s)$ and $C(I_t)$ corrected by the saturation degree are applied to the circuits 551, 552, and 553. In the circuits, the differences between the applied commands and the present phase currents $I_r$, $I_s$, and $I_t$ passing each phase, detected from the U phase current detector 581 and the W phase current detector 582 and the adder 583, are amplified, filtered, and supplied to the PWM signal process circuit 56 which is a source of an inverter circuit control signal, as voltages V(U), V(V) and V(W) corresponding to each phase command current value. The PWM signal process circuit 56 supplies PWM signals $P_1$ to $P_6$, turns ON or OFF transistor inverters 411 to 416, and drives the synchronous motor 6 by a leading phase in response to the saturation degree. In the condition where the load torque is great, then a sufficient torque is not obtained by the saturation of the output voltage corresponding to the current command value applied to the windings of each phase, the phase of the electric current applied to the winding of each phase is advanced, the perpendicular degree between the winding current and the field main magnetic flux is changed, and the torque is increased.

In the apparatus of FIGS. 5A and 5B as shown in the vector diagram FIG. 4A, the reactive component $I_b$ of the armature current is limited, so that the summation of the vectors $K_1\omega$, $K_2\cdot\omega\cdot L\cdot I_a$, and $K_2\cdot\omega\cdot L\cdot I_b$, which are the voltage components of the armature of the synchronous motor, does not exceed the center line of the circle showing the peak value V of the supplying voltage perpendicular to the vector $K_1\omega$. Namely, the value of $I_b$ is limited so that the multiplied product of $K_2$, L, and $I_b$ does not exceed $K_1$.

In order to limit the above-mentioned $I_b$, limiters 531, 532, and 533 are further provided. The limiter 531 is connected between the output terminal of the D/A converter 521 and the input terminal of the phase shift circuit 541. The limiter 532 is connected between the output terminal of the adder 525 and the input terminal of the phase shift circuit 542 and the limiter 533 is connected between the output terminal of the D/A converter 522 and the input terminal of the phase shift circuit 543.

Figure 1:
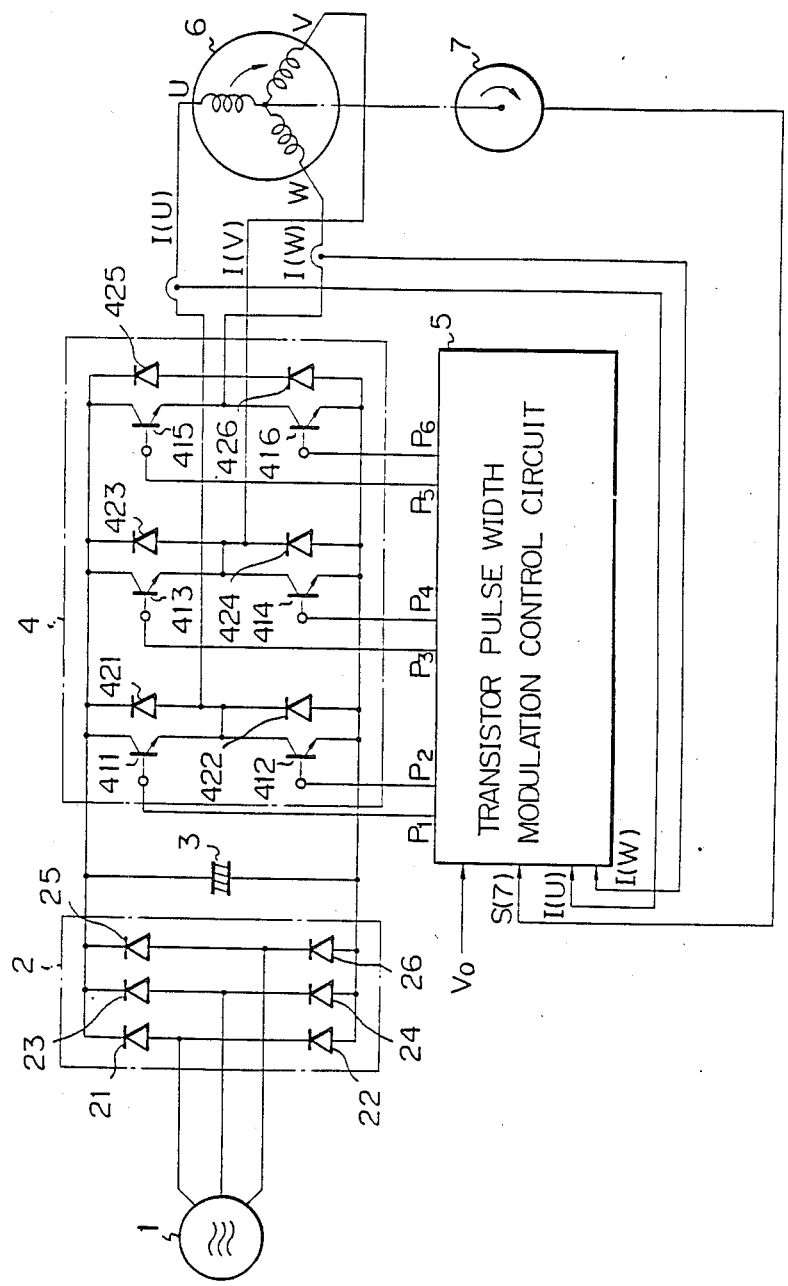
FIG. 1 is a block diagram showing a PWM control apparatus for a conventional synchronous motor.
Figure 2:
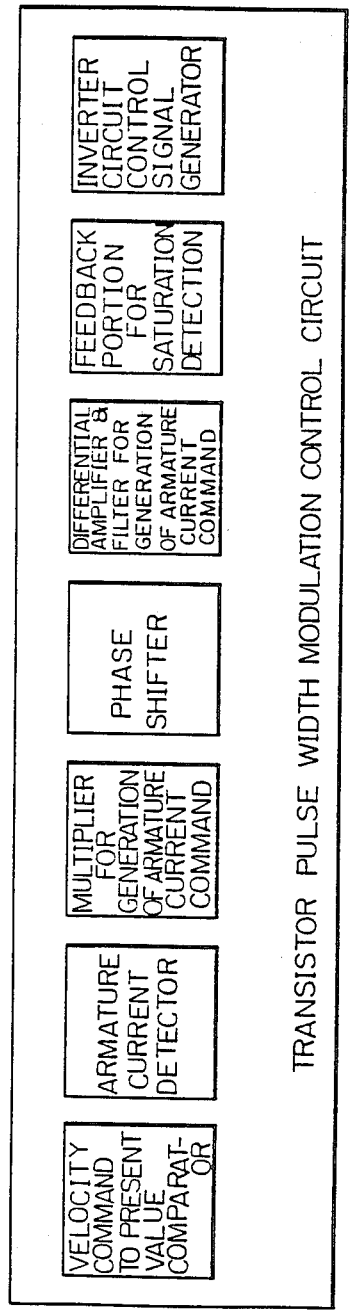
FIG. 2 is a diagram showing the outline of the function of the transistor PWM control circuit in the apparatus of FIG. 1.
Figure 3:
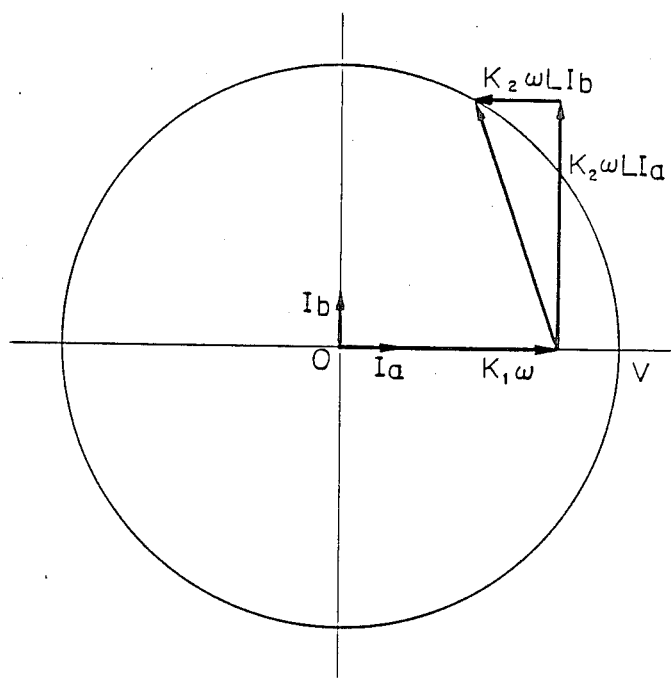
FIG. 3, FIG. 4A, FIG. 4B, FIG. 4C, and FIG. 4D are diagrams explaining vectors of voltage/current of the synchronous motor.
Figure 4B:
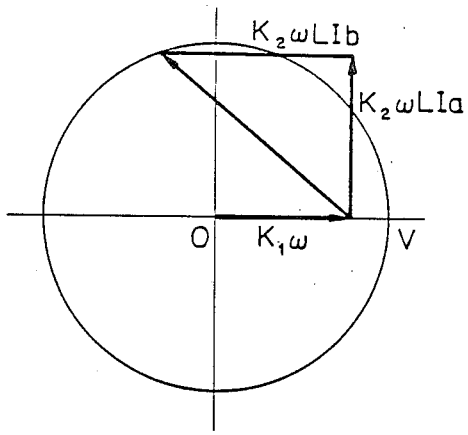
Figure 4C:
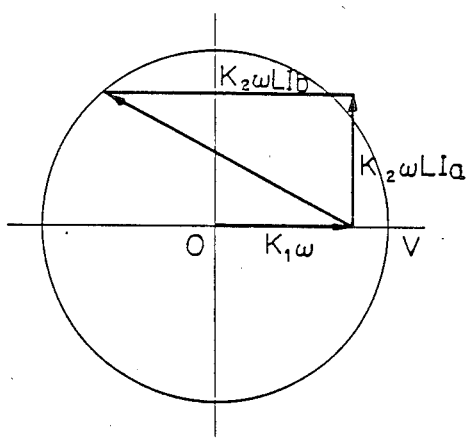
Figure 4D:
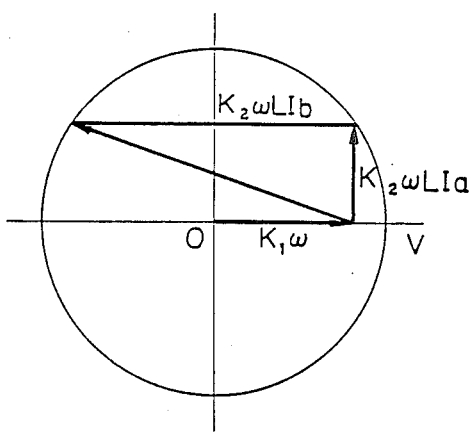

An example of the constitution of the above-mentioned limiter circuit 531 is shown in FIG. 6. The circuit is a known circuit in which Zener diodes 5313 and 5314 are used in a feedback circuit of an operational amplifier 5311. By the limiters, the correct phase current commands $B(I_r)$, $B(I_s)$, and $B(I_t)$ applied to the phase shift circuit are limited to less than a predetermined value, and the reactive current component $I_b$ of the armature of the synchronous motor is also limited, so that as shown in FIGS. 4B, 4C and 4D, the resultant vector by the vector $K_1\omega$, $K_2\cdot\omega\cdot L\cdot I_a$, and $K_2\cdot\omega\cdot L\cdot I_b$ does not enter into the left half portion of the circle in FIG. 3.

As mentioned above, $K_1\omega$ is a multiplied product of the counter-voltage constant $K_1$ and the angular velocity $\omega$ and represents a velocity voltage. $K_2\cdot\omega\cdot L\cdot I_a$ is a multiplied product of the constant $K_2$ corresponding to the pole number, the angular velocity $\omega$, the inductance L of one phase of the armature winding, and the effective current component $I_a$ in the armature, and the product is a voltage component perpendicular to the velocity voltage. $K_2\cdot\omega\cdot L\cdot I_b$ is a vector parallel and in a reverse direction to $K_1\cdot\omega$ and is obtained by substituting $I_a$ for $I_b$ in $K_2\cdot\omega L\cdot I_a$. $K_2\cdot\omega L\cdot I_b$ is supplied from the correct phase current commands $B(I_r)$, $B(I_s)$ and $B(I_t)$ and is limited by the limiters for the voltages thereof.

INDUSTRIAL APPLICABILITY

The synchronous motor to which control method and apparatus according to the present invention is applied, is for example, used for a synchronous motor for a servo motor which drives a numerical control machine tool. Further, for example, the synchronous motor is used for driving an extrusion molding machine.

We claim:

1. A control method for a synchronous motor using a magnetic field generated by permanent magnets, generating a pulse width modulation signal by comparing a difference between a current command signal representing a computed value of an armature winding current of the synchronous motor and a present value of armature winding current with a reference carrier wave, and controlling an inverter using said pulse width modulation signal; comprising the steps of:

controlling the reactive component $I_b$ of said armature winding current so that the multiplied product of $K_2$, L and $I_b$ is limited to not exceed the value of $K_1$, where the reactive component of the armature winding current is $I_b$, the inductance of the armature winding is L, the counterelectromotive force constant is $K_1$, and the constant introduced from the pole number of said synchronous motor is $K_2$;

detecting the saturation degree of the differential signal between said current command signal defined by the peak value of said reference carrier wave and the armature winding current; and changing the phase of said current command signal from a phase perpendicular to that of the armature winding current and the field main magnetic flux to another phase in response to said saturation degree to thereby control said reactive component $I_b$.

2. A control apparatus for a synchronous motor comprising a synchronous motor having an armature winding and detectors for producing armature winding currents signals, a rotor having a directly coupled rotary magnetic field and a rotation detector for detecting rotor position and velocity of rotation, an inverter circuit for supplying electric power to the armature winding and a pulse width modulation control circuit receiving a velocity command signal, an output signal of said rotation detector, and an armature winding current signal, and for generating a signal for control of said inverter circuit; wherein said pulse width modulation control circuit comprises:

comparing means for comparing the velocity command signal with a signal from said rotation detector and for generating an error signal, D/A converter means for multiplying a received saturation signal representing the saturation degree of the differential value between an armature winding current command signal and the armature winding current signal, and said error signal, and for generating corrected phase current command signals, limiter means receiving each corrected phase current command signal from said D/A converter means for multiplication, and for generating a limiting current command signal limited in accordance with a predetermined condition, amplifier and filter means for generating the armature winding current command signal from the limiting current command signal and the armature winding current signal, and pulse width modulation means receiving the armature winding current command signal from said amplifier and filter means and the reference carrier wave signal and for generating the inverter circuit control signal;

the limitation of said limiting current command signal in accordance with the predetermined condition in said limiter means being carried out by means therein which limit the reactive component $I_b$ of the armature winding current so that the multiplied produce of $K_2$, L, and $I_b$ does not exceed the value of $K_1$, wherein the reactive component of the armature winding current is defined as $I_b$, the inductance of the armature winding as L, the constant determined from the pole number of the motor as $K_2$, and the electromotive force constant of the motor as $K_1$.

3. An apparatus as set forth in claim 2 wherein, said limiter means comprises an operational amplifier, a feedback circuit of which comprises a parallel circuit of series-connected Zener diodes connected to each other with reverse polarity and a resistor.

* * * * *